(12) United States Patent
Livingston et al.

(10) Patent No.: US 6,539,797 B2
(45) Date of Patent: Apr. 1, 2003

(54) AUTO-COMPENSATING CAPACITIVE LEVEL SENSOR

(75) Inventors: Richard A. Livingston, Webster Groves, MO (US); Roger D. Chamberlain, St. Louis, MO (US)

(73) Assignee: Becs Technology, Inc., St. Louis, MO (US)

( * ) Notice: Subject to any disclaimer, the term of this patent is extended or adjusted under 35 U.S.C. 154(b) by 0 days.

(21) Appl. No.: 09/888,949

(22) Filed: Jun. 25, 2001

(65) Prior Publication Data

US 2003/0000303 A1 Jan. 2, 2003

(51) Int. Cl.$^7$ ............... G01F 23/26; G01F 23/00
(52) U.S. Cl. ................ 73/304.006; 73/290 R
(58) Field of Search ............ 73/290 R, 307 R, 73/304 C

(56) References Cited

U.S. PATENT DOCUMENTS

| | | | |
|---|---|---|---|
| 4,194,395 A | 3/1980 | Wood | 73/304 |
| 4,467,646 A | 8/1984 | Berryman et al. | 73/304 |
| 4,674,329 A * | 6/1987 | Mulder | 73/304 C |
| 5,017,909 A | 5/1991 | Goekler et al. | 340/620 |
| 5,042,299 A | 8/1991 | Wells | 73/304 |
| 5,103,368 A | 4/1992 | Hart | 73/304 |
| 5,138,880 A * | 8/1992 | Lee et al. | 73/304 |
| 5,182,545 A | 1/1993 | Goekler et al. | 340/620 |
| 5,437,184 A | 8/1995 | Shillady | 73/304 |
| 5,477,727 A * | 12/1995 | Koga | 73/304 C |
| 5,722,290 A | 3/1998 | Kronberg | 73/304 |
| 5,860,316 A * | 1/1999 | Berrill | 73/304 C |
| 6,016,697 A | 1/2000 | McCulloch et al. | 73/304 |

OTHER PUBLICATIONS

Rechner Sensors, Animated Application Note, www.rechner.com/images/animated_application_note.htm, pp. 1–2.
Rechnor Sensors, KF series Senosr, www.rechner.com/rechner/kf.htm, pp. 1–8.

* cited by examiner

Primary Examiner—Hezron Williams
Assistant Examiner—Rodney T. Frank
(74) Attorney, Agent, or Firm—Bryan Cave LLP

(57) ABSTRACT

A capacitive sensor array is adapted to be disposed in a reservoir containing fluid or material along an axis of measurement of the fluid or material to determine the level of fluid or material contained within the reservoir. The sensor array includes a plurality of reference electrodes, wherein the capacitance of each of the electrodes varies in accordance both with the extent of the array's immersion in the fluid or material and the dielectric constant of the fluid or material. The plurality of reference electrodes preferably includes a lower electrode adapted to be immersed within the fluid or material in the reservoir and whose capacitance provides an estimate of the dielectric constant of the fluid or material contained within the reservoir. The reference electrodes also include an upper electrode adapted to be positioned above the fluid or material level that provides an estimate of the dielectric constant above the level of the fluid or material in the reservoir, and a middle electrode whose capacitance varies from a calibrated initial value to a value that is dependent on the level of and the dielectric constant of the fluid or material contained within the reservoir as determined from the capacitance of the lower electrode.

18 Claims, 7 Drawing Sheets

AUTO-COMPENSATING CAPACITIVE LEVEL SENSOR

FIELD OF THE INVENTION

The present invention relates generally to capacitive sensors used to determine the presence or level of an object, fluid or materials.

BACKGROUND OF THE INVENTION

Capacitive sensors are used extensively for level measurement and proximity detection. A conventional capacitive sensor, which includes one or more conductive plates, is sensitive to changes in the dielectric constants of materials or fluids near or surrounding the plates. The capacitive sensor detects the presence or lack of material in the vicinity of the plates by measuring the capacitance between the plates, which is proportional to the dielectric constant of the material filling the space between the plates. By measuring this capacitance, the quantity of material (for level measurement) or the existence of the material (for proximity detection) may be determined. Similarly, another conventional form of capacitive sensor, which uses a sensing antenna, e.g., a long wire or strip immersed into a tank or storage bin holding a variable level of fluid or material, measures the level of the fluid or material by sensing and measuring the capacitance of the sensing antenna.

The accuracy of conventional capacitive sensors is based in large part on the dielectric constant of the material to be sensed. For example, when sensing capacitance, a fifty percent change in relative permittivity (the dielectric constant) causes a corresponding fifty percent change in the measured capacitance, i.e., the relationship is linear. Designing and producing capacitive sensors is therefor hampered by the sensitivity of conventional capacitive sensors to changes in the dielectric constant of the material to be sensed.

As an example, one application for a conventional capacitive sensor is a gasoline fuel gauge, which typically incorporates a sensor having a pair of parallel conductors that extend vertically into the fuel tank. As the fuel level rises, the capacitance measured across the two conductors increases because the dielectric constant of the fuel is higher than the air that it replaces. One problem that can arise in this convention application is when a small amount of water exists in the fuel tank together with the fuel. As the dielectric constant of water is significantly higher (about 80) than that of gasoline (about 2), even a small amount of water near the sensor can cause the capacitance to rise to a level corresponding to a full tank.

A similar situation may arise with a conventional capacitive sensor used as a proximity detector. A proximity detector typically compares a measured capacitance to a predetermined threshold and determines if materials are near the sensor by comparing the measured capacitance to the predetermined threshold. If the capacitance associated with the material can vary significantly (e.g., due to differing dielectric constants of the materials) it can be difficult to establish an appropriate threshold value.

There is a need, therefore, for a capacitive material sensor that is insensitive to changes or fluctuations in the dielectric constant of the fluid or material to be sensed. The preferred sensor would be capable of first extracting information regarding the nature of the sensed fluid or material and then capable of automatically compensating the sensor readings based on such information. Preferably, the sensor would accurately measure a variety of fluids or materials and be capable of manufacture at a relatively low cost.

SUMMARY OF THE INVENTION

The present invention overcomes these traditional difficulties and provides a capacitive sensor that automatically compensates for variations in its environment and operates reliably when used to measure or detect fluid or materials that may have varying dielectric constants. The capacitive level sensor incorporates multiple actual sensors (reference electrodes) that are used to extract information on the nature or composition of the fluid or material to be sensed and to allow the sensor to adjust or scale the level measurement based upon such extracted information. The sensor thus compensates for variations in the composition of the material or fluid being sensed.

The level sensor of the present invention includes a sensor array, which may take one of may forms, adapted to be disposed in the reservoir along an axis of measurement of the fluid or material. The sensor array includes a plurality of reference electrodes, wherein the capacitance of each of the electrodes varies in accordance both with the extent of the array's immersion in the fluid or material and the dielectric constant of the fluid or material. The plurality of reference electrodes preferably includes a lower electrode adapted to be immersed within the fluid or material in the reservoir and whose capacitance provides an estimate of the dielectric constant of the fluid or material contained within the reservoir and a middle electrode whose capacitance varies from a calibrated initial value to a value that is dependent on the level of and the dielectric constant of the fluid or material contained within the reservoir as determined from the capacitance of the lower electrode. The level sensor further includes a circuit capable of measuring the current required to repetitively charge each reference electrode to a predetermined voltage and for converting each current to a digitized sensor voltage representing the capacitance of each electrode. A microprocessor then receives and processes the digitized sensor voltages to determine the fluid or material level such that the fluid or material level is determined from the capacitance of the middle electrode and is compensated by the amount and rate of change of the capacitance of the lower electrode.

The reference electrodes may, in certain embodiments, include an upper electrode adapted to be positioned above the fluid or material level that provides an estimate of the drift in the circuit, that is then used to further compensate the calculation of the fluid or material level. The reference electrodes may comprise a relatively large number of electrodes positioned along the length of the sensor array such that the particular upper, lower, and middle electrode used for the calculation of the level are dynamically selected. In another embodiment of the present invention, the sensor array may include a compensation electrode formed from an electrode positioned at each end of the sensor array, wherein the electrodes are electrically coupled together such that the sensor array may be disposed in the reservoir regardless of its orientation.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

Figure 1:
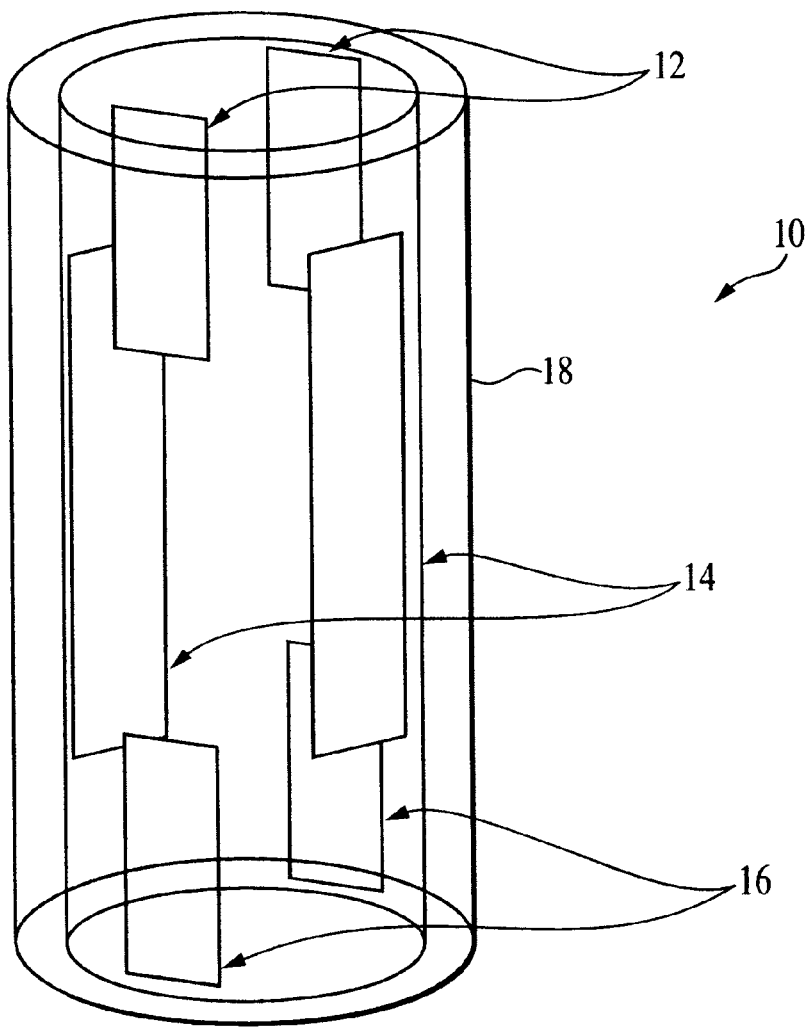
FIG. 1 is a simplified diagram of one embodiment of a capacitive sensor array in accordance with the present invention.

The capacitive level sensor of the present invention includes a capacitive sensor array that is adapted to be placed in a reservoir for determining the level of the fluid or material contained within the reservoir. FIG. 1 is a simplified diagram illustrating a capacitive sensor array 10 having three pairs of reference electrodes or plates, identified as lower electrode 16, middle electrode 14, and an optional upper electrode 12. The sensor array 10 may be used as part of a capacitive fluid or material level sensor to calculate the level of fluid or material stored within a reservoir using the capacitive readings from each of the three reference electrodes. The term reservoir as used here refers to any form of container, vessel or basin retaining fluid or materials to be measured, such as bins, tanks, hoppers, or open ponds, lakes, rivers. The fluids or materials may be water, milk, detergent, oil, fuels, and various chemical solutions, powders, and granular materials, including livestock grain, feed, plastic pellets, rock, gravel, and metals. One particular application is an oil reservoir for a diesel engine. The sensor array 10 is positioned vertically within the reservoir containing the fluid or material to be sensed and along the axis of measurement such that the amount of area of the array 10 that is covered by the fluid or material in the reservoir ultimately provides an indication of the level of the fluid or material.

As shown in FIG. 1, the upper and lower electrodes, 12 and 16, may be pairs of flat plates placed at each end of the sensor array 10. The size and shape of the flat plates may vary depending on the application and desired range of resolution. One example is to use rectangular-shaped plates approximately two inches in length and one inch in width. In the embodiment illustrated in FIG. 1, each reference electrode 12, 14, and 16, is housed on an electrode support structure, such as within the interior of a hollow non-conducting pipe 18. Each reference electrode pair is physically spaced apart along the length of the non-conducting pipe 18. In this embodiment, each reference electrode is preferably comprised of two plates positioned opposed each other with a space therebetween forming an insulating gap. As the non-conducting pipe 18 is immersed in the fluid or material under measurement, the fluid or material flows into the interior of the pipe 18 and modifies the capacitance measured between the plates forming each electrode 12, 14, and 16. In addition to flat plates, the upper and lower electrodes, 12 and 16, may be comprised of a series of thin wire strips that have a relatively narrow gap between each of the individual electrodes, which results in a relatively large change in capacitance of the electrode when the electrode is immersed or covered with fluid or material having a large dielectric constant. The middle electrode 14 may be comprised of a pair of long rectangular metallic strips or plates extending about eight inches long that preferably change capacitance about as much as the upper and lower electrodes, 12 and 16, when immersed in or covered with fluid or material. The dielectric constant of the material or fluid present within the reservoir affects the capacitance of the middle electrode 14, and as the level of the liquid within the reservoir changes, the capacitance of the middle electrode 14 changes substantially linearly with the level. While FIG. 1 illustrates one exemplary geometric configuration for the reference electrodes, those skilled in the art will recognize that other geometries may be used (some of which are described below) and all such alternative geometries are within the scope of the present invention. The dimensions of the non-conducting pipe 18 and the electrodes forming the sensor array 10 are dependent on the application because of the wide variety of shapes which the fluid reservoir may take and the required resolution (i.e., accuracy). The dielectric constant of the material or fluid present within the reservoir affects the capacitance of the middle electrode 14, and as the level of the liquid within the reservoir changes, the capacitance of the middle electrode 14 changes substantially linearly with the level.

One plate of each electrode 12, 14, 16 is preferably coupled to a fixed voltage, such as a ground reference. Each of these plates may be coupled together with connecting wire. Alternatively, there may be a single ground reference electrode plate 19, which forms a portion of each of the reference electrodes 12, 14, and 16, as shown in FIG. 2.

Figure 2:
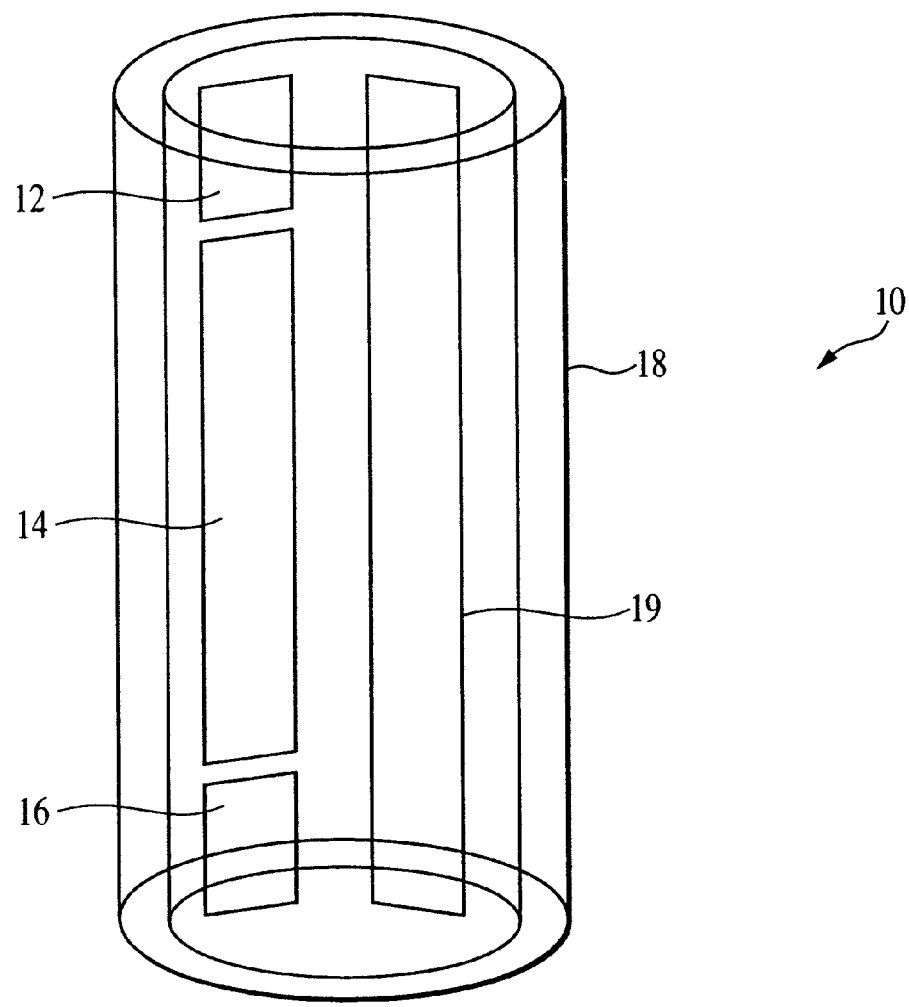
FIG. 2 is a simplified diagram of an alternative embodiment of the capacitive sensor array of the present invention.

In the embodiments shown in FIGS. 1 and 2, the upper electrode 12 is optional. Thus, a capacitive level sensor may be formed from a sensor array having only lower and middle electrodes wherein the level of fluid or material is determined from the capacitance of the middle electrode and is compensated by the amount and rate of change of the capacitance of the lower electrode.

Figure 3:
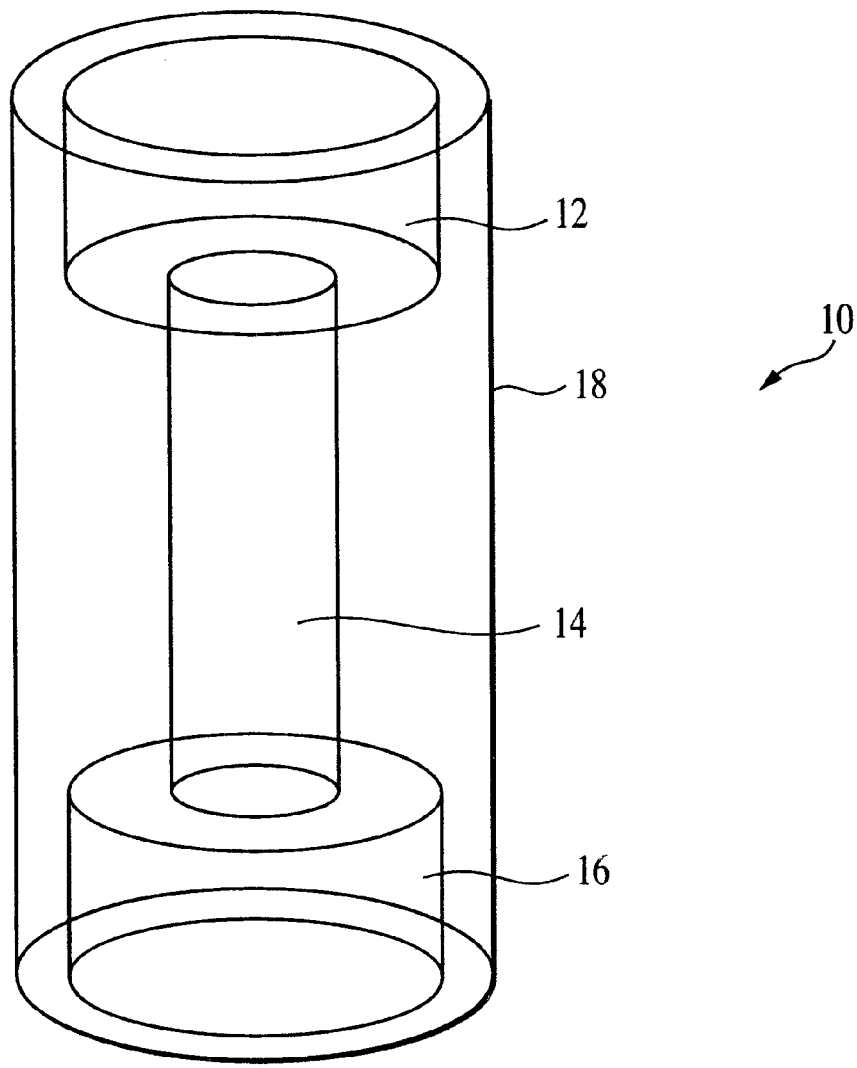
FIG. 3 is a simplified diagram of another alternative embodiment of the capacitive sensor array of the present invention.

FIG. 3 illustrates another embodiment of the sensor array 10 of the present invention in which each reference electrode is formed of a conducting cylinder. In this embodiment, upper electrode 12 and lower electrode 16 are cylinders of approximately equal diameter and middle electrode 14 is a longer, narrower cylinder. Each of these cylindrical electrodes may be placed inside of a grounded conducting pipe 18 wherein fluid is allowed to enter from the bottom. Again, in this embodiment, the upper electrode 12 is optional.

Figure 4:
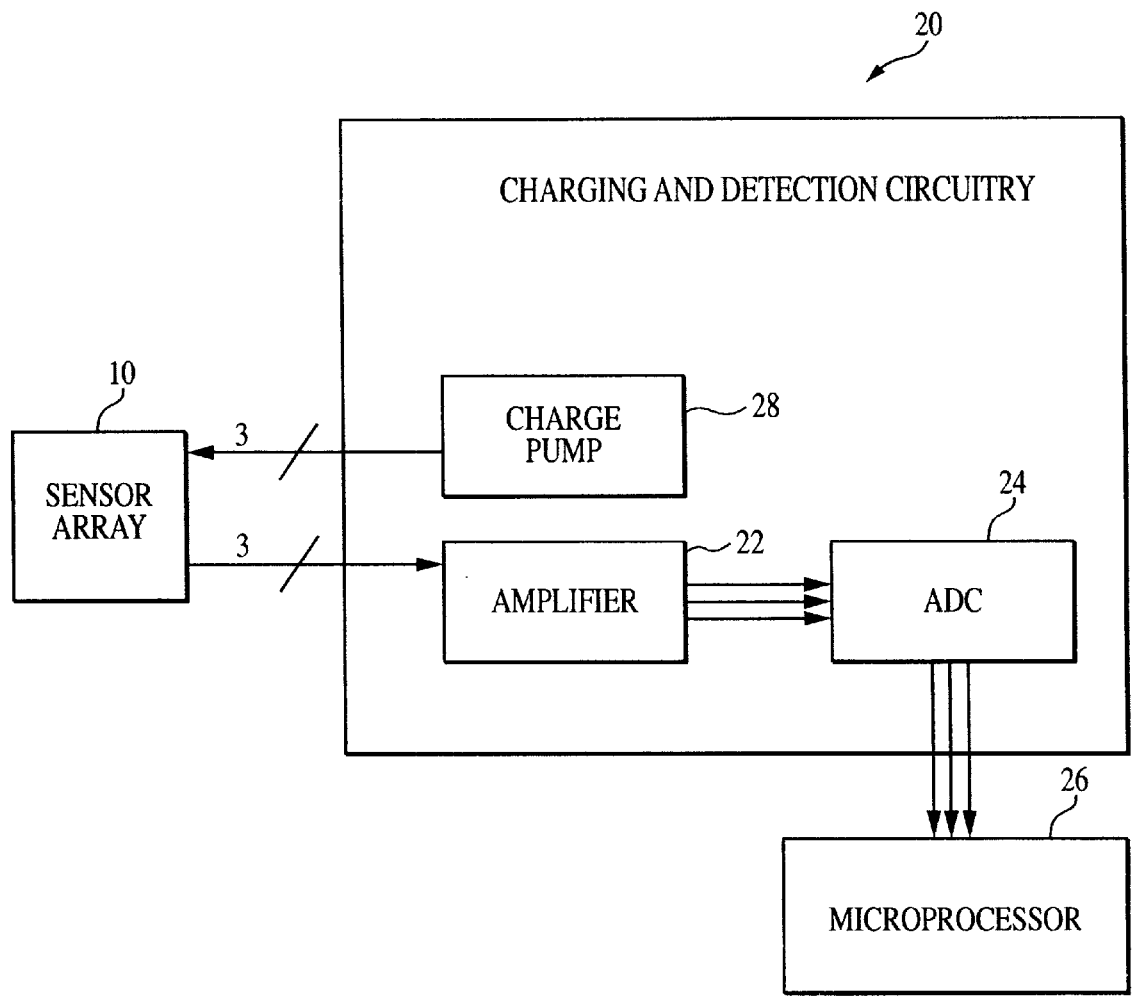
FIG. 4 is a block diagram of a capacitive level sensor that incorporates the sensor array of FIG. 1.

Another embodiment of the present invention incorporates the sensor array 10 into a capacitive level sensor that includes a circuit capable of measuring the current required to repetitively charge each reference electrode of the sensor array 10 to a predetermined voltage and for converting each current to a digitized sensor voltage representing the capacitance of each electrode. One embodiment of such a capacitive level sensor 20 is illustrated in FIG. 4, in which each of the three reference electrodes of the sensor array 10 are coupled to a charging and detection circuit 30. The charging and detection circuit 30 includes a charge pump circuit 28, designed to measure the amount of current required to charge each of the electrodes 12, 14, and 16 of the sensor array 10 to a predetermined voltage. The predetermined voltage is established as a function of the various components used in circuit 30. Although many forms of charge pump circuitry may be used, one preferred implementation is disclosed in U.S. patent application Ser. No. 09/587,010, entitled "Balanced Charge Pump Capacitive Material Sensor" (incorporated herein), which is designed to automatically compensate for expected variations in the reference voltages commonly used in conventional switched capacitor or charge pump capacitive sensor assemblies. The measured current from each of the three sensor electrodes is fed into a transimpedance amplifier 22 and converted into a voltage, which is then delivered to an 8 bit A/D converter 24. The A/D converter 24 converts the analog voltage signals associated with each reference electrode into a digital signal ranging from 0 to 255 counts. The three digital signals are then coupled to a digital computer or microprocessor 26 adapted to calculate the level of fluid or material within the reservoir based on the A/D counts from each of the three reference electrodes. In certain implementations, each of the circuit elements shown in FIG. 3 may be incorporated into an assembly together with insulating pipe 18 and the capacitive sensor array 10.

Figure 5:
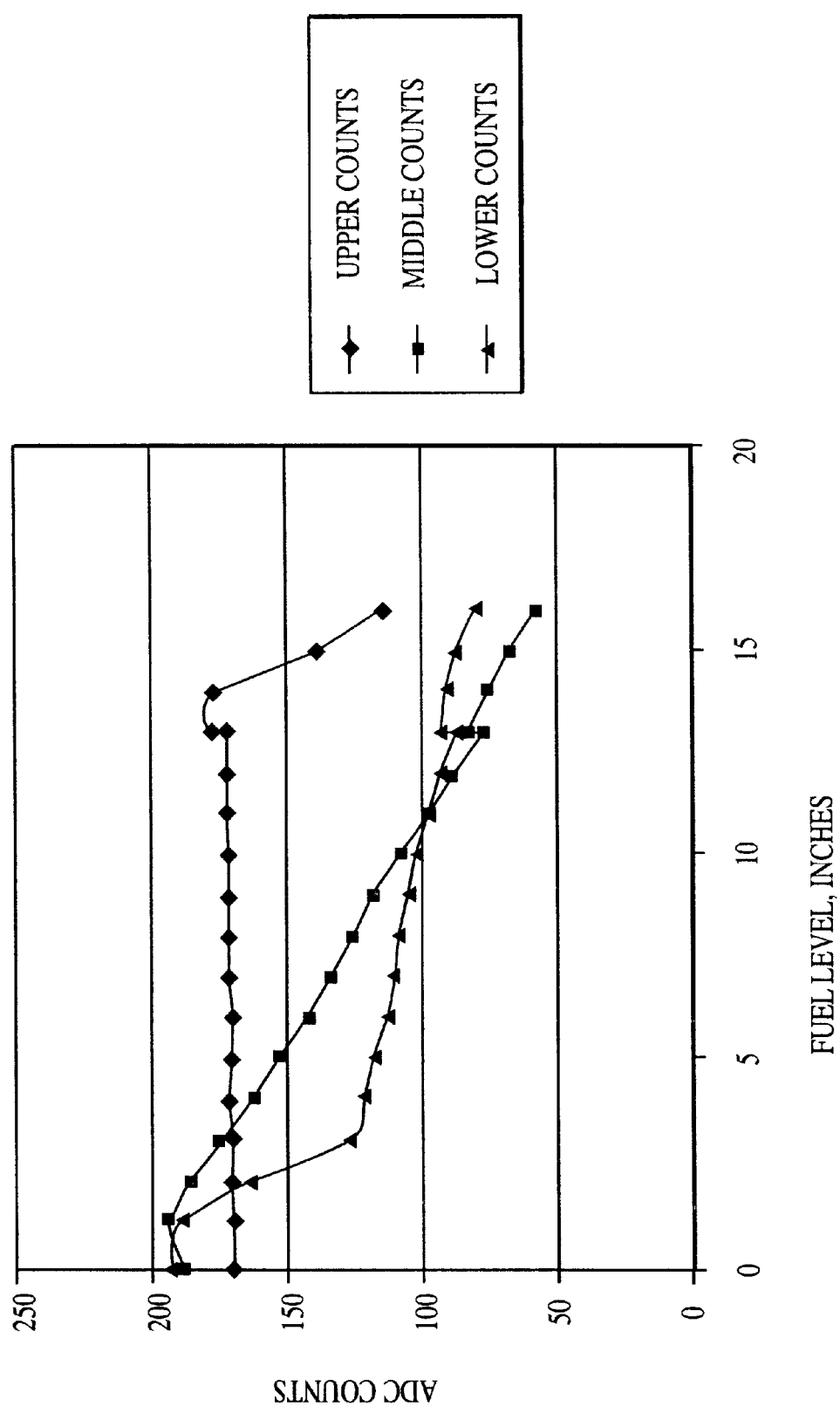
FIG. 5 is a graph showing voltage as a function of rising fluid level, as determined by the capacitive level sensor of the present invention.

FIG. 5 is a graph showing representative data derived from the output of the A/D converter 24 as the fluid level varies within a reservoir from empty to full. The data shown in FIG. 5 was collected using an inverting transimpedance amplifier 22 and, therefore, the reading (A/D counts) from each of the three reference electrode decreases as the fluid level (and capacitance) increases. As illustrated in FIG. 5, as the fluid level increases in the reservoir, the capacitance of the reference electrodes increases and the associated A/D counts decrease. Precisely where and by how much the A/D counts change with a change in fluid or material level depends on the shape and location of the individual electrodes. The data represented in FIG. 5 was obtained using the capacitive sensor array 10 illustrated in FIG. 3. Thus, for the lower electrode 16, which is about two inches in length, the A/D counts drop abruptly between one and three inches and then level off. We note that the shallow slope to the curve for the lower electrode counts above a fluid level of three inches arises due to the capacitance of the wiring connecting the lower electrode 16 to the circuitry used in connection with the sensor array 10. This must be accounted for in the calculations presented below. The A/D counts associated with the middle electrode 14 begin to decrease at about two inches and continue to decrease gradually to a much higher fluid level. The A/D counts associated with the upper electrode 12 demonstrate little change until the fluid level rises within a few inches of the top of the reservoir. At this point the A/D count associated with the upper electrode 12 abruptly drops off.

The microprocessor 26 calculates the fluid level based on the A/D counts associated with each of the three reference electrodes. The A/D counts as a function of fluid height for each electrode may be represented as:

$$V_U(l) = V_{Ucal} + V_{Udrift} \quad (1)$$

$$V_M(l) = V_{Mcal} + V_{Mdrift} - (\epsilon_r - 1) \cdot (V_{M\Delta 0} + V_{M\Delta max} \cdot l) \quad (2)$$

$$V_L(l) = V_{Lcal} + V_{Ldrift} - (\epsilon_r - 1) \cdot (V_{L\Delta 0} + V_{L\Delta max} \cdot l) \quad (b\ 3)$$

where:
the level (l) is between some predetermined ZERO and FULL levels, over which range the lower electrode 16 is always fully immersed in the fluid, the middle electrode 14 is partially immersed to a greater or lesser extent, and the upper electrode 12 is always completely clear of the fluid;

$V_M(l)$ is the A/D count value for the middle electrode 14 as a function of the height of the fluid (or material) (l);

$V_{Mcal}$ is the A/D count value for the middle electrode 14 when the sensor array 10 is not immersed in fluid (i.e., the calibration value);

$V_{Mdrift}$ is the amount of circuit drift, if any, at a given time, in the A/D count value for the middle electrode 14;

$V_{M\Delta 0}$ represents the change in A/D count value, from $V_{Mcal}$, for the middle electrode 14 when the fluid is up to the desired ZERO level;

$V_{M\Delta max}$ represents the change in A/D count value, from $V_{Mcal}$, when the middle electrode 14 is immersed in fluid up to the desired FULL level; and $\epsilon_r$ is the relative dielectric constant of the fluid or material.

Note that the subscripts M (representing the middle electrode 14) may be replaced with either U (representing the upper electrode 12) or L (lower electrode 16) in the subscripts in each of these definitions.

Also, $L_{max}$ is the fluid level l at the desired FULL level on the middle electrode 14; and $L_{min}=0$ is the fluid level l at which the lower electrode 16 is completely covered with fluid and the fluid is up to the desired ZERO level on the middle electrode 14.

The unknowns $\epsilon_r$, l and $V_{xdrift}$ may be calculated in terms of the other known parameters ($V_{U\Delta 0}$, $V_{L\Delta 0}$, $V_{U\Delta max}$, $V_{L\Delta max}$), which are based on the design of the sensor array 10 and may be determined experimentally during calibration and stored in the microprocessor 26. This calibration may be conducted once and the parameters then stored into the microprocessor 26 of each level sensor manufactured based on the same design. Likewise, the $V_{Mcal}$, $V_{Ucal}$ and $V_{Lcal}$ values may be determined for each individual unit, if necessary, and likewise stored in the microprocessor 26.

The fundamental operating concept for the sensor array 10 is that the lower electrode 16 provides an estimate of the dielectric constant of the unknown fluid or material contained within the reservoir and that the capacitance of the middle electrode 14 changes from some known and calibrated initial value to another value that is dependent on the level of and the dielectric constant of the fluid. The equations provided below take into account both the amount and rate of change in the capacitance of the lower electrode 16.

Initially the circuit drift values are estimated, assuming that all three electrodes will drift by the same amount, which may be safely assumed based on the design of the charging and detection circuit 30. Thus:

$$V_{Udrift} = V_U(l) - V_{Ucal}$$

$$V_{Mdrift} \cong V_{Udrift}$$

$$V_{Ldrift} \cong V_{Udrift} \quad (4)$$

Under this assumption, $V_{xdrift}$ can be effectively eliminated from equations (2) and (3) by subtracting $V_U(l) - V_{UCal}$ from $V_M(l)$ and $V_L(l)$. Likewise, the $V_{xCal}$ values, determined during calibration, can also be subtracted from each $V_x(l)$, giving corrected values:

$$V_{Mcorrected}(l) = V_M(l) - V_{Mcal} - V_U(l) + V_{Ucal} \quad (5)$$
$$= -(\epsilon_r - 1) \cdot (V_{M\Delta 0} + V_{M\Delta max} \cdot l)$$

$$V_{Lcorrected}(l) = V_L(l) - V_{Lcal} - V_U(l) + V_{Ucal} \quad (6)$$
$$= -(\epsilon_r - 1) \cdot (V_{L\Delta 0} + V_{L\Delta max} \cdot l)$$

The level may now be calculated using the following formula:

$$\text{level} = K \cdot \frac{V_{Mcorrected}(l) - A \cdot V_{Lcorrected}(l)}{V_{Lcorrected}(l) - B \cdot V_{Mcorrected}(l)} \quad (7)$$

where the values A, B and K can be calculated during calibration as:

$$A = \frac{V_{M\Delta 0}}{V_{L\Delta 0}} \quad (8)$$

$$B = \frac{V_{L\Delta max}}{V_{M\Delta max}} \quad (9)$$

$$K = \frac{\text{level}_{max}}{L_{max}} \cdot \frac{V_{L\Delta 0}}{V_{M\Delta max}} \quad (10)$$

where $\text{level}_{max}$ is the desired value to be calculated when the fluid level is "full".

Equation (7) automatically compensates for changes in the dielectric constant of the fluid or material within the reservoir (by calculating ($\epsilon_r - 1$)). In addition, the calculation compensates for electronic drift, to the extent that the electronic drift is common to all three electrodes in a similar fashion and to the extent that the upper electrode 12 is not yet immersed. This calculation also compensates for the slope on the reading from the lower electrode 16 as shown in FIG. 5, and for some initial offset to the middle electrode reading that is dependent on the dielectric constant of the fluid.

The equations set forth above assume a sensor array 10 having an upper, middle, and lower electrodes. The same equations also apply to a sensor array 10 without an upper electrode, wherein all of the terms related to the upper electrode are considered to be zero. Thus, the readings associated with the lower and middle electrodes will not be corrected.

Figure 6:
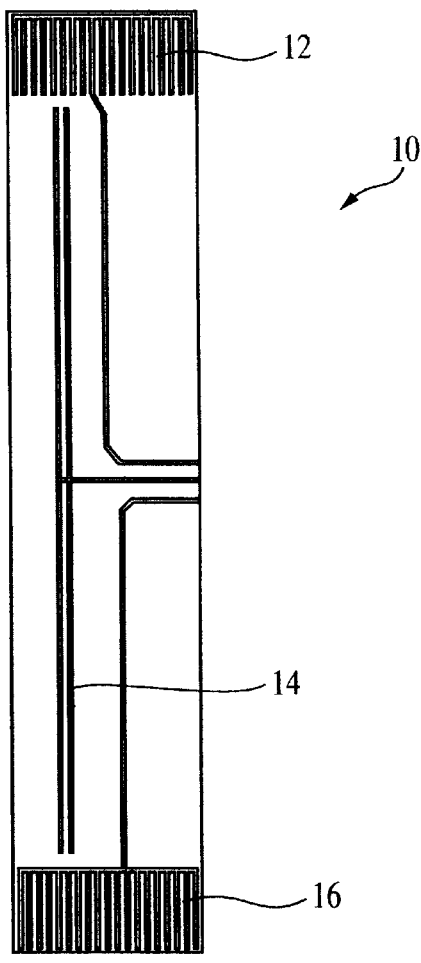
FIGS. 6, 7 and 8 illustrate alternative embodiments of the capacitive sensor array of the present invention.

As discussed above, the sensor array 10 may take many forms. FIG. 6 illustrates an alternative embodiment for the sensor array 10, in which the three reference electrodes (shown as interdigitated fingers) are integrally incorporated onto a flat printed circuit board as deposits of electroless plating or printing on the surface of the board. The circuit board also contains circuitry (such as that illustrated in FIG. 4) for calculating the fluid or material level based on the capacitance readings from the three reference electrodes, 12, 14, and 16. This configuration minimizes lead capacitance associated with the capacitive sensor. The printed circuit board and its components may be sealed forming a complete sensing module. Certain of the components, for example, the charge and detection circuitry 30, the A/D converter 24, and the microprocessor 26 may be packaged together as a single application specific integrated circuit (ASIC) that is disposed on the board.

Figure 7:
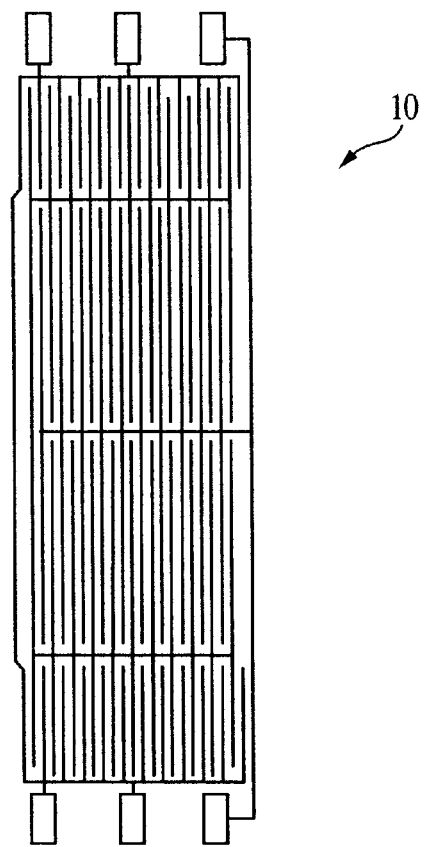

FIG. 7 shows another embodiment for the capacitive level sensor capable of accurately determining fluid height regardless of its orientation into a reservoir, thus easing the installation of the level sensor. In this embodiment, the upper and lower reference electrodes, 12 and 16 are connected together and treated as the lower electrode. This embodiment generally requires the drift in the A/D counts for the upper and lower electrodes to be negligible. The calculations used with this embodiment are identical to those used with the sensor array of FIG. 1, except that the upper electrodes values $V_U$ and $V_{Ucal}$ are both assumed to be zero.

Figure 8:
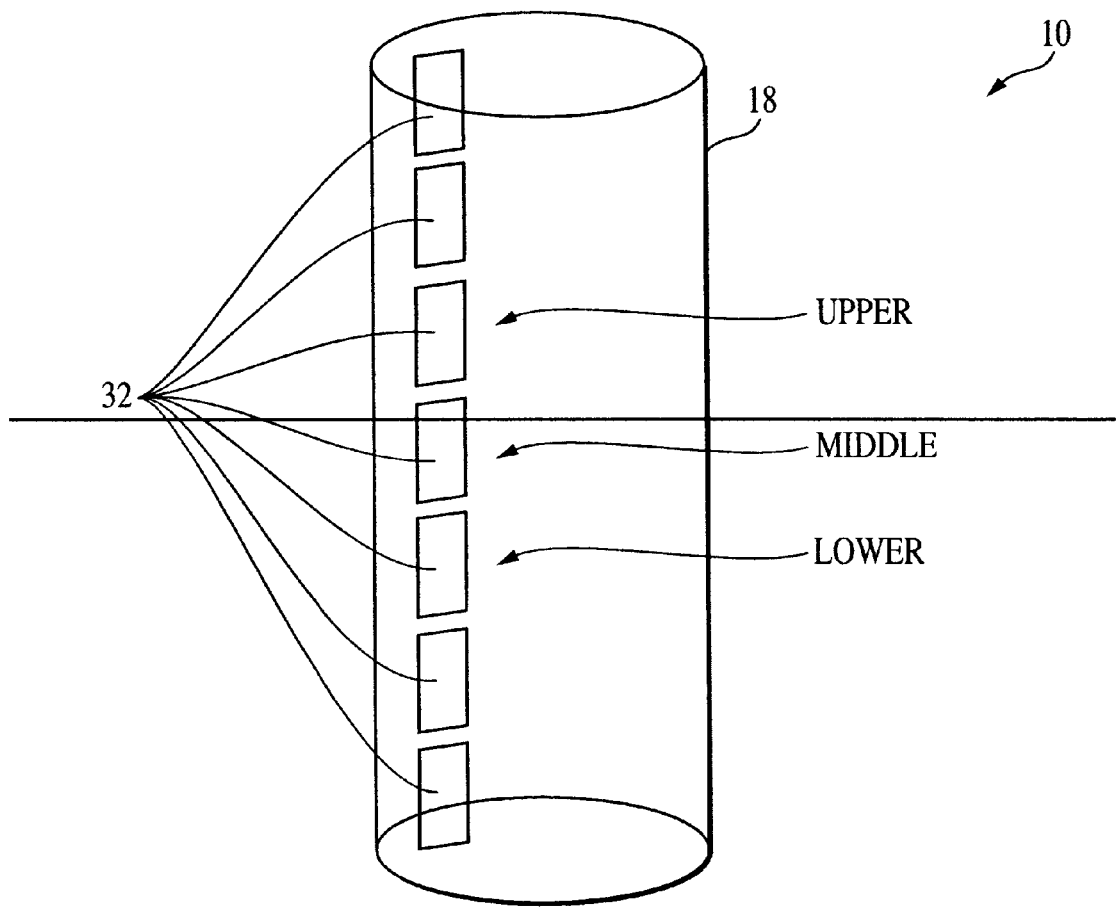

FIG. 8 illustrates a sensor array 10 having more than three reference electrodes (each labeled as 32). During use, three of these electrodes are dynamically selected as the lower, middle, and upper reference electrodes. For example, the electrode at or near the surface level of the fluid or materials is selected as the middle electrode 14, the electrode below the surface level is selected as the lower electrode 16, and the first electrode above the surface level is selected as the upper electrode 12. In practice, this may be accomplished by measuring the capacitance of each electrode 32, then deciding (in software) which electrode is at the level of the liquid, and then choosing the electrodes adjacent (above and below) as the upper and lower reference electrodes respectively. For example, starting with the two electrodes 32 nearest to the bottom of the sensor array 10, the capacitance of each is measured. If the measured capacitance of these two electrodes are within a threshold of each other, which threshold may vary depending on the particular application, then it is determined that both electrodes are fully immersed. This process of measuring and comparing capacitances continues up along the sensor array with the next electrode. If the next electrode has a measured capacitance within the threshold of the first two, then this electrode is also determined to be fully immersed. This process continues until a electrode is reached that has a measured capacitance that is different than the measured capacitance of its lower neighbor electrode (i.e., outside the threshold). This electrode is then identified as the lower electrode 16. A similar process proceeds from the top of the sensor array 10. The capacitance of the top two electrodes 32 are measured and compared. If these capacitances are within a threshold, which again may vary depending on the application, then both electrodes are determined to be above the fluid or materials. The process then continues to the next electrode until an electrode is reached that has a measure capacitance that is different (i.e., outside the threshold) of the electrodes above it. The last electrode having a matched capacitance is then viewed as the upper electrode 12. The electrode between the upper electrode 12 and the lower electrode 16 is selected as the middle electrode 14. The sensor array 10 of FIG. 8 is particularly useful with stratified liquids.

The present invention also includes a method for calculating the level of fluid or material contained within a reservoir using any multi-electrode capacitive sensor array 10, including those described above. Preferably, the calibrated capacitance of each of the reference electrodes in both air and when fully immersed in the fluid or material is initially determined. The method includes disposing the sensor array 10 in the reservoir along an axis of measurement of the fluid or material contained within the reservoir. The capacitance of each of the upper, middle and lower reference electrodes 12, 14, and 16, will vary in accordance both with the extent of the electrode's immersion in the fluid and the dielectric constant of the fluid or material contained within the reservoir. The sensor array 10 is positioned within the reservoir such that the lower electrode 16 is submersed in the fluid or material and the upper electrode 12 of the sensor array 10 extends above the surface of the fluid or material with the fluid or material surface being at a level between the upper and lower electrodes and in contact with the middle electrode 14. The sensor array is coupled to a circuit, such as charging and detection circuitry 30, to measure the amount of current required to repetitively charge each reference electrode to a predetermined voltage. These measured currents are then converted to a digitized sensor voltage representing the capacitance of each reference electrode. The dielectric constant of the fluid or material within the container may then be calculated based on the capacitance of the lower electrode 16 as represented by the digitized voltage from the lower electrode 16. The level of the fluid or material within the reservoir may then be calculated using the equations provided above.

The capacitive sensor described herein has a number of uses including as a level sensor and/or proximity detector that can operate over a wide range of materials without the need to be tuned for each specific material application. In addition, the present invention provides the ability to detect variations in dielectric constant along the sensing conductor.

Although the present invention has been described in considerable detail with reference to certain presently preferred embodiments thereof, other embodiments are possible without departing from the spirit and scope of the present invention. Therefore the appended claims should not be limited to the description of the preferred versions contained herein.

I claim:

1. A capacitive level sensor for measuring the level of fluid or material contained within a reservoir comprising:
   a capacitive sensor array adapted to be disposed in the reservoir along an axis of measurement of the material or fluid contained within the reservoir, the sensor array comprising a plurality of reference electrodes wherein the capacitance of each of the electrodes varies in accordance both with the extent of the array's immersion in the fluid or material and the dielectric constant of the fluid or material, the plurality of reference electrodes comprising:
      a lower electrode adapted to be positioned near the bottom of the reservoir and whose capacitance provides an estimate of the dielectric constant of the fluid or material contained within the reservoir; and
      a middle electrode that extends along the length of the array and whose capacitance varies from a calibrated initial value to a value that is dependent on the level of and the dielectric constant of the fluid or material contained within the reservoir as determined from the capacitance of the lower electrode;
   a circuit capable of measuring the capacitance of each reference electrode and generating a digitized sensor voltage representing the capacitance of each electrode; and
   a microprocessor for receiving and processing the digitized sensor voltages to determine the fluid or material level, wherein the level is determined as a linear function of the capacitance of the middle electrode and is compensated by the amount and rate of change of the capacitance of the lower electrode, and wherein the microprocessor determines the level of the fluid or material in accordance with:

$$\text{level} = K \cdot \frac{V_{Mcorrected}(l) - A \cdot V_{Lcorrected}(l)}{V_{Lcorrected}(l) - B \cdot V_{Mcorrected}(l)}, \text{ where}$$

$$A = \frac{V_{M\Delta 0}}{V_{L\Delta 0}}$$

$$B = \frac{V_{L\Delta max}}{V_{M\Delta max}}$$

$$K = \frac{\text{level}_{max}}{L_{max}} \cdot \frac{V_{L\Delta 0}}{V_{M\Delta max}}$$

$V_{Mcorrected}(l) = V_M(l) - V_{Mcal}$ $V_{Lcorrected}(l) = V_L(l) - V_{Lcal}$ $L_{max}$ represents the fluid or material level when the fluid or material is at the top of the middle reference electrode;

$\text{level}_{max}$ represents a calibrated full fluid level;

$V_M(l) = V_{Mcal} - (\epsilon_r - 1) \cdot (V_{M\Delta 0} + V_{M\Delta max} \cdot l)$ $V_L(l) = V_{Lcal} - (\epsilon_r - 1) \cdot (V_{L\Delta 0} + V_{L\Delta max} \cdot l)$ $V_{L\Delta 0}$, $V_{M\Delta 0}$ represent the change in the digitized sensor voltages from the lower and middle reference electrodes from the calibrated initial values to values obtained when the level of the fluid or material is at the bottom of each electrode;

$V_{L\Delta max}$, $V_{M\Delta max}$ represent the change in digitized sensor voltages from the lower and middle reference electrodes from the calibrated values to values obtained when the electrodes are each fully immersed in the fluid or material; where:

$V_L(l)$ and $V_M(l)$ represent the digitized sensor voltages from the lower and middle reference electrodes as a function of the level of the fluid or material;

$V_{Lcal}$ and $V_{Mcal}$ represent the calibrated initial values for the digitized sensor voltages from the lower and middle reference electrodes, calibrated when the sensor array is not immersed into the fluid or material; and $\epsilon_r$ is the relative dielectric constant of the fluid or material.

2. The capacitive level sensor of claim 1 wherein the plurality of reference electrodes further comprises an upper electrode adapted to be positioned above the fluid or material level that provides an estimate of any offset drift in the circuit.

3. The capacitive level sensor of claim 2 further comprising an electrode support structure, wherein the plurality of reference electrodes are mounted onto the support and are physically separated along the length of the support.

4. The capacitive level sensor of claim 3 wherein the electrode support comprises an elongated hollow cylindrical non-conducting pipe having a lower end adapted to be disposed first into the reservoir and submersed in the fluid or material, and an upper end, wherein each of the reference electrodes is positioned within the interior of the pipe such that the lower electrode is adjacent the lower end of the pipe, the upper electrode is adjacent the upper end of the pipe and the middle electrode extends along the length of the pipe between the upper and lower electrodes.

5. The capacitive level sensor of claim 3 wherein the electrode support comprises a flat insulating board having a lower end adapted to be disposed first into the reservoir and submersed in the fluid or material, and an upper end, wherein each of the reference electrodes is mounted onto the insulating board such that the lower electrode is adjacent the lower end of the board, the upper electrode is adjacent the upper end of the board and the middle electrode extends along the length of the board between the upper and lower electrodes.

6. The capacitive level sensor of claim 2 wherein each of the plurality of reference electrodes comprises a pair of plates positioned opposing each other with a space therebetween such that as the sensor array is disposed in the reservoir, the fluid or material flows into the spaces and modifies the capacitance between each pair of plates.

7. The capacitive level sensor of claim 2 wherein the reference electrodes comprise deposits of electroless plating or printing on the surface of the board.

8. The capacitive level sensor of claim 2 wherein the reference electrodes comprise conducting cylinders.

9. A capacitive level sensor for measuring the level of fluid or material contained within a reservoir comprising:

an elongate capacitive sensor array having a first and second end and adapted to be disposed in the reservoir along an axis of measurement of the material or fluid contained within the reservoir, the sensor array comprising:
- a compensation electrode formed from an electrode positioned at each end of the sensor array, wherein the electrodes are electrically coupled together such that the sensor array may be disposed in the reservoir regardless of its orientation, the compensation electrode having a capacitance that provides an estimate of the dielectric constant of the fluid or material contained within the reservoir; and
- a measurement electrode that extends along the length of the array and whose capacitance varies from a calibrated initial value to a value that is dependent on the level of and the dielectric constant of the fluid or material contained within the reservoir as determined from the capacitance of the compensation electrode;

a circuit capable of measuring the capacitance of each electrode and generating a digitized sensor voltage representing the capacitance of each electrode; and a microprocessor for receiving and processing the digitized sensor voltages to determine the fluid or material level, wherein the level is determined as a linear function of the capacitance of the measurement electrode and is compensated by the amount and rate of change of the capacitance of the compensation electrode, and wherein the microprocessor determines the level of the fluid or material in accordance with:

$$\text{level} = K \cdot \frac{V_{Mcorrected}(l) - A \cdot V_{Lcorrected}(l)}{V_{Lcorrected}(l) - B \cdot V_{Mcorrected}(l)}, \text{ where}$$

$$A = \frac{V_{M\Delta 0}}{V_{L\Delta 0}}$$

$$B = \frac{V_{L\Delta max}}{V_{M\Delta max}}$$

$$K = \frac{\text{level}_{max}}{L_{max}} \cdot \frac{V_{L\Delta 0}}{V_{M\Delta max}}$$

$$V_{Mcorrected}(l) = V_M(l) - V_{Mcal}$$

$$V_{LCorrected}(l) = V_L(l) - V_{Lcal}$$

$L_{max}$ represents the fluid or material level when the fluid or material is at the top of the measurement electrode;

$\text{level}_{max}$ represents a calibrated full fluid level;

$$V_M(l) = V_{Mcal} - (\epsilon_r - 1) \cdot (V_{M\Delta 0} + V_{M\Delta max} \cdot l)$$

$$V_L(l) = V_{Lcal} - (\epsilon_r - 1) \cdot (V_{L\Delta 0} + V_{L\Delta max} \cdot l)$$

$V_{L\Delta 0}$, $V_{M\Delta 0}$ represent the change in the digitized sensor voltages from the compensation and measurement electrodes from the calibrated initial values to values obtained when the level of the fluid or material is at the bottom of each electrode;

$V_{L\Delta max}$, $V_{M\Delta max}$ represent the change in digitized sensor voltages from the compensation and measurement electrodes from the calibrated values to values obtained when the electrodes are each fully immersed in the fluid or material; where:

$V_L(l)$ and $V_M(l)$ represent the digitized sensor voltages from the compensation and measurement electrodes as a function of the level of the fluid or material;

$V_{Lcal}$ and $V_{Mcal}$ represent the calibrated initial values for the digitized sensor voltages from the compensation and measurement electrodes, calibrated when the sensor array is not immersed into the fluid or material; and $\epsilon_r$ is the relative dielectric constant of the fluid or material.

10. The capacitive level sensor of claim 9 further comprising an electrode support structure, wherein the compensation and measurement electrodes are mounted onto the support and are physically separated along the length of the support.

11. The capacitive level sensor of claim 10 wherein the electrode support comprises an elongated hollow cylindrical non-conducting pipe having a lower end adapted to be disposed first into the reservoir and submersed in the fluid or material, and an upper end, wherein compensation and measurement electrodes are positioned within the interior of the pipe such that the compensation electrode is adjacent the lower and upper end of the pipe, and the measurement electrode extends along the length of the pipe between the upper and lower electrodes.

12. The capacitive level sensor of claim 9 wherein each of the compensation and measurement electrodes comprises a pair of plates positioned opposing each other with a space therebetween such that as the sensor array is disposed in the reservoir, the fluid or material flows into the spaces and modifies the capacitance between each pair of plates.

13. The capacitive level sensor of claim 9 wherein the electrode support comprises a flat insulating board having a lower end adapted to be disposed first into the reservoir and submersed in the fluid or material, and an upper end, wherein each of the compensation and measurement electrodes is mounted onto the insulating board such that the compensation electrode is adjacent the lower and upper end of the board and the measurement electrode extends along the length of the board between the compensation electrodes.

14. The capacitive level sensor of claim 9 wherein the compensation and measurement electrodes comprise deposits of electroless plating or printing on the surface of the board.

15. The capacitive level sensor of claim 9 wherein the compensation and measurement electrodes comprise conducting cylinders.

16. A method for calculating the level of fluid or material contained within a reservoir comprising the steps of:
- providing a capacitive sensor array adapted to be disposed in the reservoir along an axis of measurement of the fluid or material contained within the reservoir, the sensor array comprising a middle and a lower reference electrode wherein the capacitance of each of the electrodes varies in accordance both with the extent of the electrode's immersion in the fluid or material and the dielectric constant of the fluid or material;
- determining the calibrated capacitance of each of the electrodes in air;
- determining the capacitance of each of the electrodes when the reference electrodes are fully immersed in the fluid or material;
- positioning the sensor array within the reservoir such that the lower electrode is submersed in the fluid or material with the fluid or material surface being in contact with the middle electrode;
- measuring the capacitance of each reference electrode and generating a digitized sensor voltage representing the capacitance of each electrode; and calculating the level of the fluid or material within the reservoir as a linear function of the capacitance of the middle electrode compensated by the amount and rate of change of the capacitance of the lower electrode, and wherein the microprocessor determines the level of the fluid or material in accordance with:

$$\text{level} = K \cdot \frac{V_{Mcorrected}(l) - A \cdot V_{Lcorrected}(l)}{V_{Lcorrected}(l) - B \cdot V_{Mcorrected}(l)}, \text{ where}$$

$$A = \frac{V_{M\Delta 0}}{V_{L\Delta 0}}$$

$$B = \frac{V_{L\Delta max}}{V_{M\Delta max}}$$

$$K = \frac{\text{level}_{max}}{L_{max}} \cdot \frac{V_{L\Delta 0}}{V_{M\Delta max}}$$

$$V_{Mcorrected}(l) = V_M(l) - V_{Mcal}$$

$$V_{Lcorrected}(l) = V_L(l) - V_{Lcal}$$

$L_{max}$ represents the fluid or material level when the fluid or material is at the top of the middle reference electrode;

$\text{level}_{max}$ represents a calibrated full fluid level;

$$V_M(l) = V_{Mcal} - (\epsilon_r - 1) \cdot (V_{M\Delta 0} + V_{M\Delta max} \cdot l)$$

$$V_L(l) = V_{Lcal} - (\epsilon_r - 1) \cdot (V_{L\Delta 0} + V_{L\Delta max} \cdot l)$$

$V_{L\Delta 0}$, $V_{M\Delta 0}$ represent the change in the digitized sensor voltages from the lower and middle reference electrodes from the calibrated initial values to values obtained when the level of the fluid or material is at the bottom of each electrode;

$V_{L\Delta max}$, $V_{M\Delta max}$ represent the change in digitized sensor voltages from the lower and middle reference electrodes from the calibrated values to values obtained when the electrodes are each fully immersed in the fluid or material; where:

$V_L(l)$ and $V_M(l)$ represent the digitized sensor voltages from the lower and middle reference electrodes as a function of the level of the fluid or material;

$V_{Lcal}$ and $V_{Mcal}$ represent the calibrated initial values for the digitized sensor voltages from the lower and middle reference electrodes, calibrated when the sensor array is not immersed into the fluid or material; and $\epsilon_r$ is the relative dielectric constant of the fluid or material.

17. The method of claim 16 wherein the sensor array further comprises an upper electrode adapted to be positioned above the fluid or material level to provide an estimate of any offset drift in the measurement of the current required to repetitively charge each reference electrode to a predetermined voltage.

18. A method for calculating the level of fluid or material contained within a reservoir comprising the steps of:

providing a capacitive sensor array adapted to be disposed in the reservoir along an axis of measurement of the fluid or material contained within the reservoir, the sensor array comprising a plurality of reference electrodes wherein the capacitance of each of the electrodes varies in accordance both with the extent of the electrode's immersion in the fluid or material and the dielectric constant of the fluid or material;

determining the calibrated capacitance of each of the electrodes in air;

determining the capacitance of each of the electrodes when the reference electrodes are fully immersed in the fluid or material;

positioning the sensor array within the reservoir such that at least one of the electrodes is submersed in the fluid or material; another of the electrodes is in contact with the fluid or material surface; and at least one of the electrodes is positioned above the fluid or material level;

dynamically selecting a lower electrode as the electrode positioned directly below the fluid or material level;

dynamically selecting a middle electrode as the electrode positioned at or near the fluid or material surface;

dynamically selecting an upper electrode as the electrode positioned directly above the fluid or material level;

measuring the capacitance of each of the lower, middle and lower electrodes and generating a digitized sensor voltage representing the capacitance of each electrode; and calculating the level of the fluid or material within the reservoir as a linear function of the capacitance of the middle electrode compensated by the amount and rate of change of the capacitance of the lower electrode, wherein the capacitance of the upper electrode provides an estimate of any offset drift in the measurement of the current required to repetitively charge each of the lower, middle and lower electrodes to the predetermined voltage, wherein the level of the fluid or materials is calculated in accordance with:

$$\text{level} = K \cdot \frac{V_{Mcorrected}(l) - A \cdot V_{Lcorrected}(l)}{V_{Lcorrected}(l) - B \cdot V_{Mcorrected}(l)}, \text{ where}$$

$$A = \frac{V_{M\Delta 0}}{V_{L\Delta 0}}$$

$$B = \frac{V_{L\Delta max}}{V_{M\Delta max}}$$

$$K = \frac{\text{level}_{max}}{L_{max}} \cdot \frac{V_{L\Delta 0}}{V_{M\Delta max}}$$

$$V_{Mcorrected}(l) = V_M(l) - V_{Mcal} - V_U(l) + V_{Ucal}$$
$$= -(\epsilon_r - 1) \cdot (V_{M\Delta 0} + V_{M\Delta max} \cdot l)$$

$$V_{Lcorrected}(l) = V_L(l) - V_{Lcal} - V_U(l) + V_{Ucal}$$
$$= -(\epsilon_r - 1) \cdot (V_{L\Delta 0} + V_{L\Delta max} \cdot l)$$

$L_{max}$ represents the fluid or material level when the fluid or material is at the top of the middle reference electrode;

$\text{level}_{max}$ represents a calibrated full fluid level;

$V_{L\Delta 0}$, $V_{M\Delta 0}$, $V_{U\Delta 0}$ represent the change in the digitized sensor voltages from the lower, middle and upper reference electrodes from the calibrated values to values obtained when the level of the fluid or material is at the bottom of each electrode;

$V_{L\Delta max}$, $V_{M\Delta max}$, $V_{U\Delta max}$ represent the change in digitized sensor voltages from the lower, middle and upper reference electrodes from the calibrated values to values obtained when the electrodes are each fully immersed in the fluid or material;

$$V_U(l) = V_{Ucal} + V_{Udrift}$$

$V_U(l)$, $V_L(l)$, and $V_M(l)$ represent the digitized sensor voltages from the upper, lower and middle reference electrodes as a function of the level of the fluid or material;

$V_{Ucal}$, $V_{Lcal}$, and $V_{Mcal}$ represent calibrated values for the digitized sensor voltages from the upper, lower and middle reference electrodes, calibrated when the sensor array is not immersed into the fluid or material;

$V_{Mdrift}$, $V_{Mdrift}$, and $V_{Mdrift}$ represent the amount of circuit drift in the digitized sensor voltage from the upper, lower and middle reference electrodes; and $\epsilon_r$ is the relative dielectric constant of the fluid or material.

* * * * *